(12) United States Patent
Efrati et al.

(10) Patent No.: US 8,019,066 B1
(45) Date of Patent: Sep. 13, 2011

(54) SYSTEM, METHOD AND COMPUTER PROGRAM PRODUCT FOR PROVIDING ACCESS TO A PLURALITY OF SERVICE PROVIDERS UTILIZING A SINGLE INTERFACE

(75) Inventors: Ariel Efrati, Hod-Hasharon (IL); Sagit Zohar, Rosh Ha'ain (IL); Sami Gaist, Ra'anana (IL)

(73) Assignee: Amdocs Software Systems Limited, Dublin 2 (IE)

( * ) Notice: Subject to any disclaimer, the term of this patent is extended or adjusted under 35 U.S.C. 154(b) by 1153 days.

(21) Appl. No.: 11/610,399

(22) Filed: Dec. 13, 2006

(51) Int. Cl.
*H04M 3/42* (2006.01)
(52) U.S. Cl. .............................. 379/201.02; 379/201.01
(58) Field of Classification Search .............. 379/201.01, 379/201.02, 201.04, 201.05
See application file for complete search history.

(56) References Cited

U.S. PATENT DOCUMENTS

| 5,987,114 | A | 11/1999 | Sonnenberg | 379/220 |
|---|---|---|---|---|
| 6,324,277 | B1 | 11/2001 | Akinpelu et al. | 379/221 |
| 2002/0010915 | A1* | 1/2002 | Maeda | 717/11 |
| 2002/0099562 | A1* | 7/2002 | Bruce et al. | 705/1 |
| 2003/0046709 | A1* | 3/2003 | Kuo-Wen | 725/120 |
| 2003/0191677 | A1* | 10/2003 | Akkiraju et al. | 705/8 |
| 2004/0015405 | A1* | 1/2004 | Cloutier et al. | 705/26 |
| 2004/0250085 | A1* | 12/2004 | Tattan et al. | 713/186 |
| 2006/0215636 | A1* | 9/2006 | Corley et al. | 370/352 |
| 2010/0325204 | A1* | 12/2010 | Mathias et al. | 709/203 |

\* cited by examiner

*Primary Examiner* — William Deane, Jr.
(74) *Attorney, Agent, or Firm* — Zilka-Kotab, PC

(57) ABSTRACT

A system, method and computer program product are provided for providing access to a plurality of service providers. In use, information associated with a customer is received. In addition, a plurality of service providers are identified, based on the information. Further, a single interface is presented for providing access to the plurality of service providers.

19 Claims, 7 Drawing Sheets

SYSTEM, METHOD AND COMPUTER PROGRAM PRODUCT FOR PROVIDING ACCESS TO A PLURALITY OF SERVICE PROVIDERS UTILIZING A SINGLE INTERFACE

FIELD OF THE INVENTION

The present invention relates to accessing various services, and more particularly to accessing service providers.

BACKGROUND

In order to receive services (e.g. telephone, cable, Internet, etc.), people are generally required to subscribe to particular services offered by service providers. With service providers each focusing on different services, people are therefore required to have subscriptions with multiple different service providers. Thus, if a subscriber desires to contact service providers (e.g. to change a service, to receive an offer, to change contact information, etc.), the subscriber must separately contact each service provider.

There is thus a need for overcoming these and/or other problems associated with the prior art.

SUMMARY

A system, method and computer program product are provided for providing access to a plurality of service providers. In use, information associated with a customer is received. In addition, a plurality of service providers are identified, based on the information. Further, a single interface is presented for providing access to the plurality of service providers

DETAILED DESCRIPTION

Figure 1:
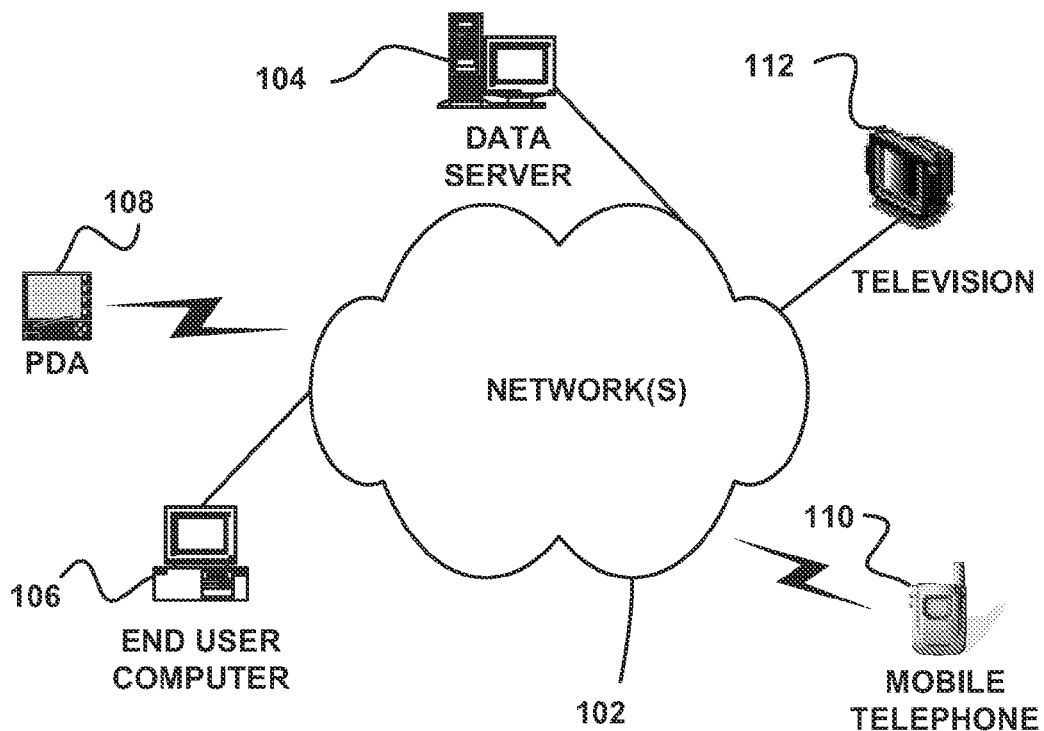
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
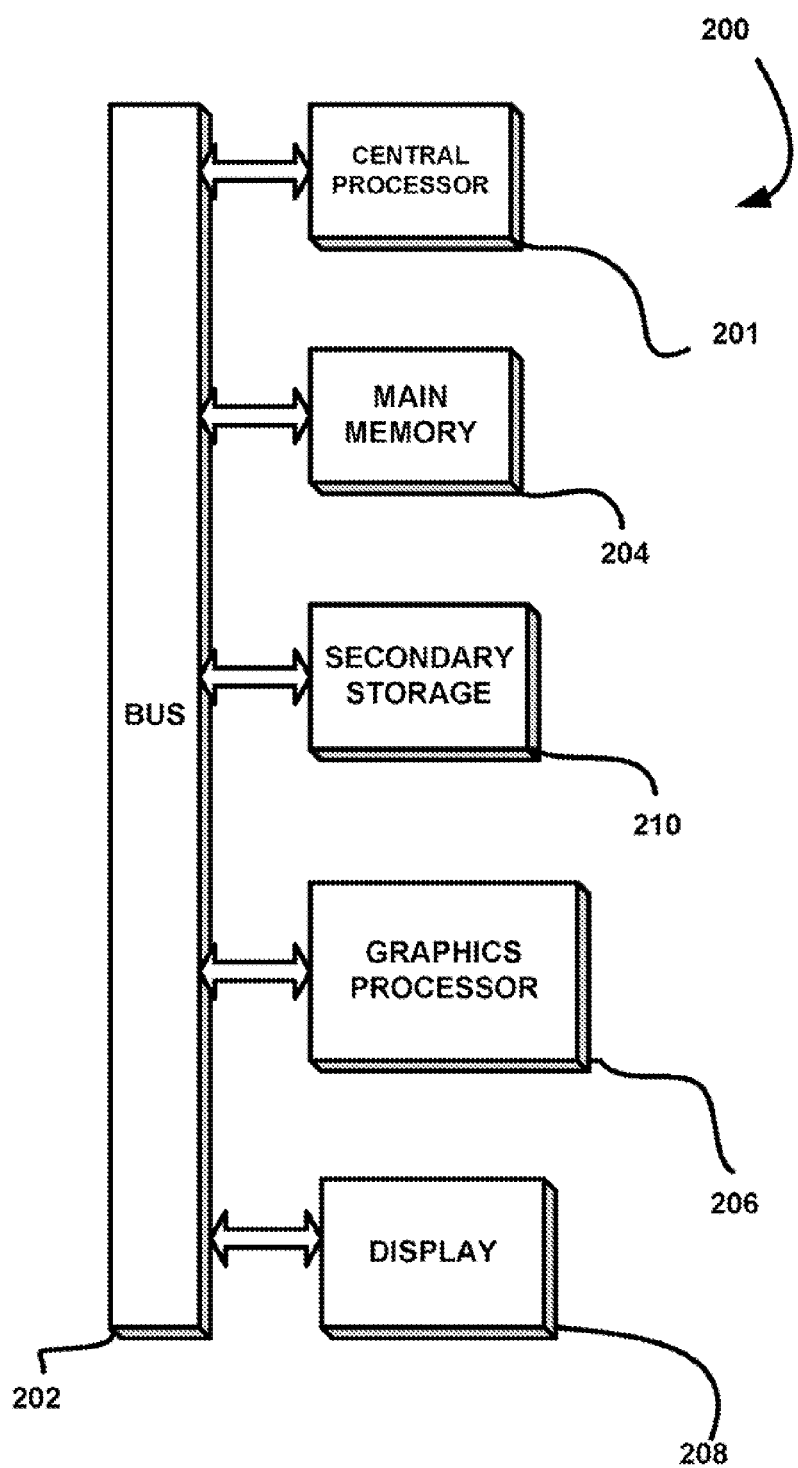
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 200 to perform various functions. Memory 204, storage 210 and/or any other storage are possible examples of computer-readable media.

Figure 3:
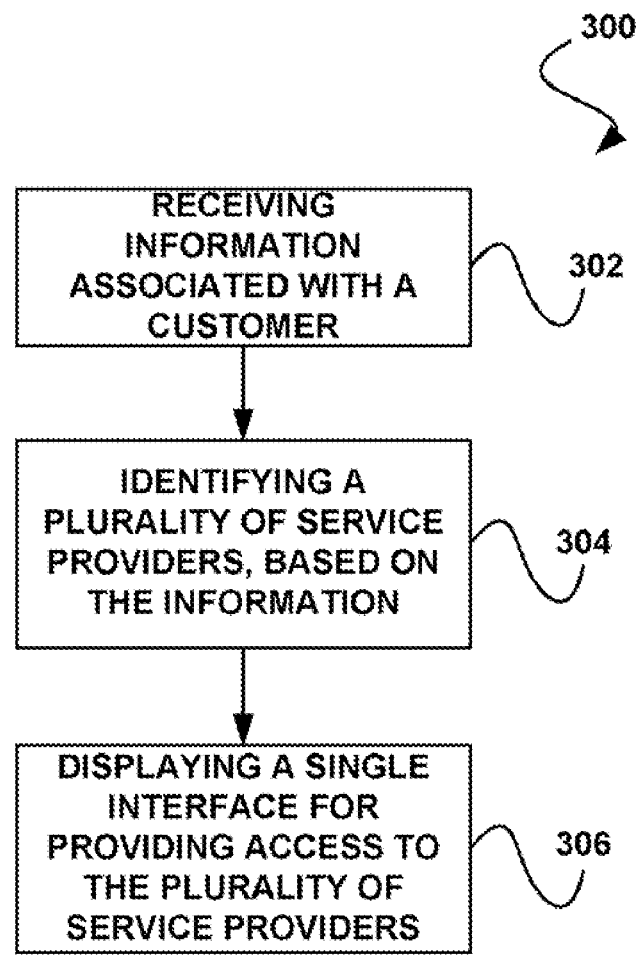
FIG. 3 shows a method for accessing a plurality of service providers utilizing a single interface, in accordance with one embodiment.

FIG. 3 shows a method 300 for accessing a plurality of service providers utilizing a single interface, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, information associated with a customer is received. In one embodiment, the customer may include a person and/or entity (e.g. company, organization, etc.). In another embodiment, the customer may, or may not, be associated with a subscription to a service.

Such service may include, for example, a landline telephone service, a mobile telephone service, a cable television service, a satellite television service, an Internet service, a satellite radio service and/or any other service capable of being provided to a customer. Thus, the customer may or may not have a subscription to a service provided by a service provider (e.g. telephone service provider, cable television service provider, satellite television service provider, Internet service provider, satellite radio service provider, etc.).

Further, the information associated with the customer may include data that identifies the customer. In one embodiment, the information may include a telephone number of the customer (e.g. landline telephone number, mobile telephone number, etc.). The information may also include an address of the customer (e.g. home address, business address, etc.), in accordance with another embodiment.

Optionally, the information may include an account number associated with a subscription of the customer to a service. In other various embodiments, the information may include a social security number, a driver's license number and/or any other information capable of being associated with the customer. In addition, the information may include a single identifying piece of data and/or a plurality of different identifying pieces of data associated with the customer. For example, the information may include a user name and password, or simply a key.

Moreover, the information may be received in any desired manner. For example, the information may be received by entering the information into a graphical user interface (GUI). As another example, the information may be received utilizing voice recognition. Also, the information may be received from the customer, from an operator in communication with the customer, etc.

A plurality of service providers are then identified based on the information, as shown in operation 304. In one embodiment, the customer may have an account (e.g. subscription, etc.) with each of the plurality of service providers. Thus, the plurality of service providers may be identified by identifying accounts of the customer associated therewith, based on the information received in operation 302.

For example, the received information associated with the customer may be utilized to search for customer accounts in customer databases of various service providers. Of course, a master database of all customer accounts associated with various service providers may also be maintained. In this way, the master database may be searched for identifying accounts of the customer based on the received information associated therewith.

In another embodiment, the plurality of service providers may be identified by identifying a location of the customer. For example, service providers may be identified which offer a service in the vicinity of a location of the customer. Thus, service providers offering a service in the vicinity of the customer's home, business, etc. may be identified. Of course, it should be noted that the plurality of service providers may be identified in any desired manner utilizing information associated with the customer.

Still yet, a single interface is presented for providing access to the plurality of service providers, as shown in operation 306. In various embodiments, such presentation may be visual and/or audible in nature. The single interface may, in one embodiment include a GUI with one or more windows, pages, etc.; for example. In addition, the single interface may be provided over a network, such as any of the networks described above with respect to FIG. 1.

In another embodiment, the single interface may provide access to the plurality of service providers by providing channels of communication to the service providers. In another embodiment, the single interface may provide access to the plurality of service providers by providing content associated with the service providers. For example, such content may include descriptions of the service providers and/or services provided by the service providers.

Further, the single interface may provide access to the plurality of service providers by providing offers associated with the service providers. Such offers may include offers made by each individual service provider and/or offers made as a package by multiple service providers. Moreover, the single interface may provide access to the plurality of service providers by allowing such offers to be accepted by the customer via the single interface.

In this way, the single interface may provide access to a plurality of different service providers. Moreover, in some optional embodiments, the single interface may be tailored to include those service providers subscribed to or capable of being subscribed to by the customer. Accordingly, the single interface may optionally be customized for each customer.

More illustrative information will now be set forth regarding various optional architectures and features of different embodiments with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
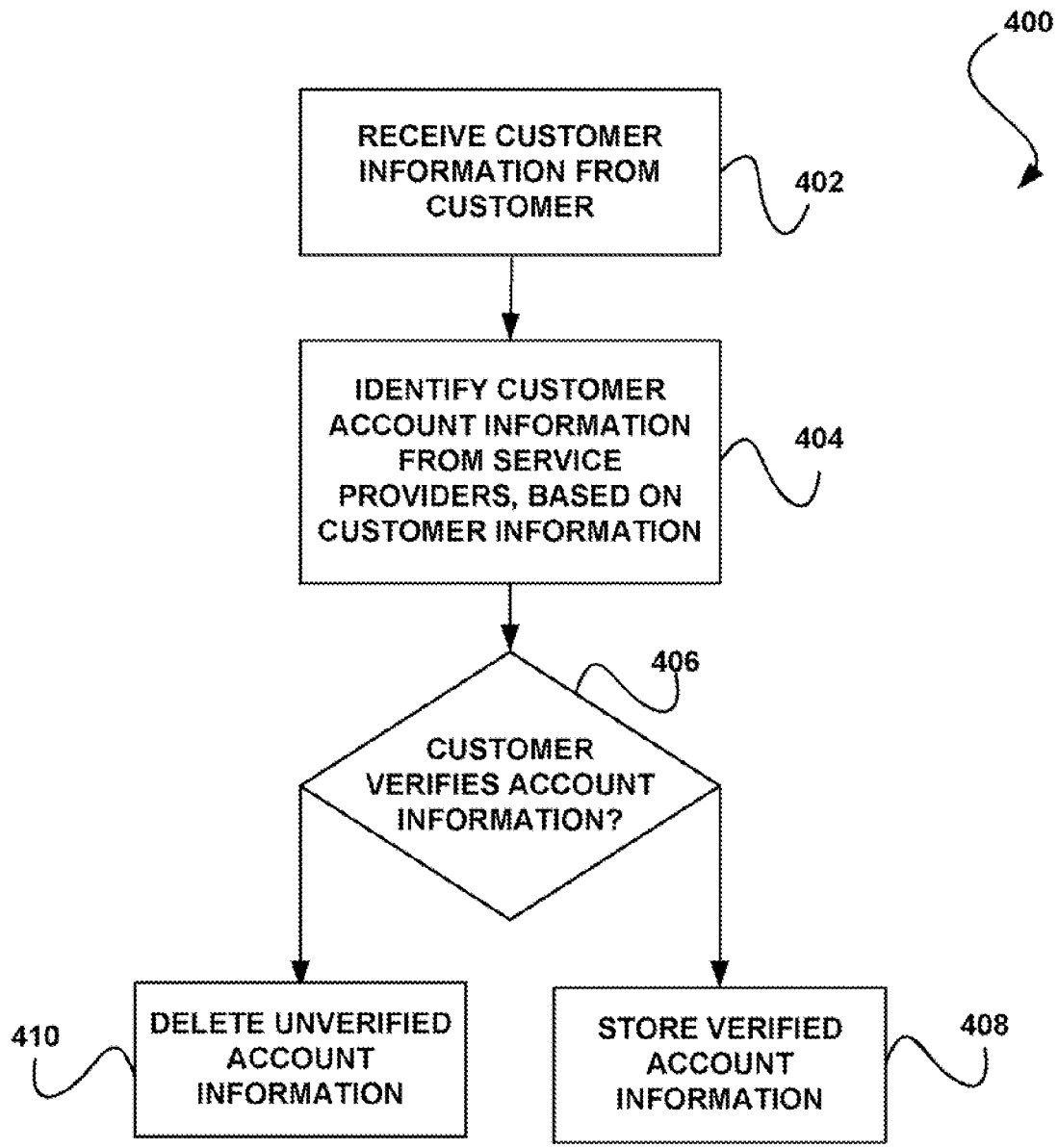
FIG. 4 shows a method for storing/updating account information associated with a customer of a plurality of service providers, in accordance with another embodiment.

FIG. 4 shows a method 400 for storing/updating account information associated with a customer of a plurality of service providers, in accordance with another embodiment. As an option, the method 400 may be implemented in the context of the details of FIGS. 1-3. Of course, however, the method 400 may be carried out in any desired environment. Again, the aforementioned definitions may equally apply to the description below.

As shown in operation 402, customer information is received from a customer. The customer information may optionally include any identifying information associated with the customer (e.g. telephone number, address, etc.). In addition, the customer information may be received directly from the customer or via an operator in communication with the customer. Still yet, the customer information may be received via a GUI, for example.

Customer account information is then identified from service providers based on the customer information, as shown in operation 404. The customer account information may include any information capable of being associated with an account (e.g. subscription, etc.) of the customer. For example, the customer account information may include identifying information associated with the customer (e.g. telephone number, address, social security number, password, etc.), an account number associated with the customer, services subscribed to by the customer (e.g. television channels subscribed to, Internet data speed connection subscribed to, etc.), offers accepted by the customer, products utilized by the customer, etc.

As described above with respect to FIG. 3, the customer information may be utilized to search for customer accounts in customer databases of various service providers. Thus, for example, a query may be performed on a plurality of customer databases, each associated with a different service provider, over a network utilizing the customer information. Of course, as another option, a master database of all customer accounts may be maintained by synchronizing with customer databases of service providers, such that the master database may similarly be searched for identifying customer accounts.

Customer accounts matching the customer information may accordingly be identified. Further, customer account information, such as that described above, associated with such identified customer accounts may also be identified. In this way, customer account information may be identified from service providers based on customer information received from a customer.

Additionally, it may be determined whether the customer has verified the customer account information, as shown in decision 406. In one embodiment, the customer may verify the customer account information by accepting the customer account information. Optionally, the customer may accept each portion of the customer account information (e.g. specific accounts, services subscribed to, etc.).

In another embodiment, the customer may verify the customer account information by providing an additional piece of customer information capable of verifying each piece of customer account information. Thus, for example, the customer may provide the last four digits of his/her social security number in order to verify a particular piece of customer account information. The type of verification required may optionally be dependent on each particular service provider associated with the identified customer account information. Accordingly, the customer may also decide not to verify such customer account information by refraining from accepting, by selecting an option to remove a particular piece of customer account information, etc.

In this way, if the customer has verified the customer account information, or any portion thereof, then such verified customer account information, or verified portion thereof, is stored. Note operation 408. In this way, updated customer account information may optionally be stored each time a customer provides customer information (as in operation 402). The verified customer account information, the customer information received from the customer, and/or information regarding with service providers associated with the verified customer account information may optionally be stored in a principal customer account database associated with an interface capable of receiving the customer information from the customer (as described in operation 402). For example, such principal customer account database may include verified customer account information associated with a plurality of customers.

Optionally, the verified customer account information may be stored locally, in conjunction with a system that provides the single interface, for example. Furthermore, a session in which the customer provided the customer information (operation 402) may be logged. Reasoning for the session may also be logged. Such logged information may further be stored locally, as an option.

If, however, the customer has not verified the customer account information, or any portion thereof, then such unverified customer account information, or unverified potion thereof, is deleted. Note operation 410. In one embodiment, the unverified customer account information may be deleted from a temporary list of customer account information that has been identified, such as that in operation 404. In another embodiment, the unverified customer account information may be deleted from a customer database of a service provider from which such customer account information was identified.

In yet another embodiment, the unverified customer account information may be deleted from a master customer account database, such as that described above. Thus, verified account information associated with a plurality of service providers with respect to a customer of such plurality of service providers may be stored/updated. Reasons for storing and/or updating such verified customer account information will be described in more detail with respect to FIG. 5.

Figure 5:
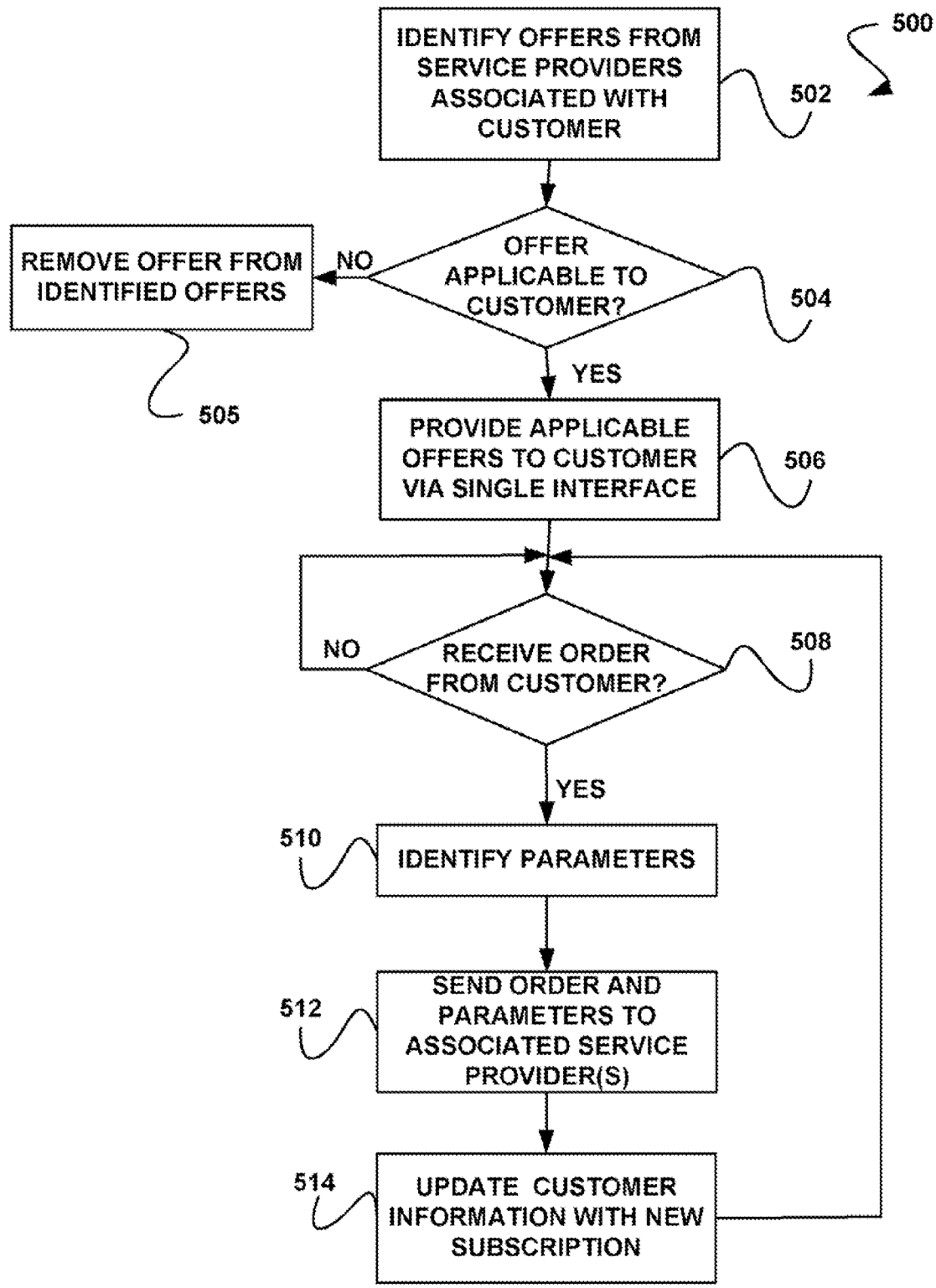
FIG. 5 shows a method for creating orders with respect to a plurality of service providers utilizing a single interface, in accordance with yet another embodiment.

FIG. 5 shows a method 500 for creating orders with respect to a plurality of service providers utilizing a single interface, in accordance with yet another embodiment. As an option, the method 500 may be implemented in the context of the details of FIGS. 1-4. Of course, however, the method 500 may be carried out in any desired environment. Again, the aforementioned definitions may equally apply to the description below.

As shown in operation 502, offers from service providers associated with a customer are identified. The offers may include service offers, discount offers, package offers, subscription offers, etc. In one embodiment, the offers may include services that combine services provided by service providers. In particular, the offers may combine features/capabilities of a plurality of services provided by service providers.

Just by way of example, in one optional embodiment, the offers may include a unified voice-mail service for providing voice mail from a plurality of other services [e.g. landline phone service, mobile phone service, voice over internet protocol (VoIP) service, etc.], at least some of which are provided by different service providers. As another example, in another embodiment, the offers may include a unified e-mail account that consolidates all e-mail accounts into one virtual e-mail account, thus providing a centralized account for accessing e-mail associated with a plurality of e-mail accounts, at least some of which are provided by different service providers. As yet another example, the offers may include a service for providing a television electronic program guide via a wireless device, thus combining service of a television service provider and a wireless device service provider. Of course, it should be noted that any combination of services capable of being provided may be also be included in the offers.

In another embodiment, the offers may be associated with service providers. Optionally, the offers may be identified by first identifying service providers associated with the customer. The service providers associated with the customer may include service providers for which the customer has an account, service providers providing a service in a locality of the customer, etc.

In one embodiment, such service providers may be identified utilizing a database of customer account information. The database of customer account information may include, for example, the principal customer account database described above with respect to FIG. 4, the service provider databases, etc. Of course, however, the service providers may be identified in any desired manner.

Further, the offers may be identified by searching an offer database (e.g. catalog, etc.) associated with each of the identified service providers. Of course, however, the offers may also be identified by searching a master offer database which includes all offers within offer databases associated with various service providers. Thus, only offers for services for which the customer has an account may be identified.

It is then determined whether the identified offers are applicable to the customer, as shown in decision 504. Such decision may be made based on customer information. In one embodiment, only offers capable of being accepted by the customer (e.g. due to location of the customer and servicing vicinities, products utilized by the customer, etc.) may be determined to be applicable to the customer. In another embodiment, only offers matching predefined criteria received by the customer may be determined to be applicable to the customer.

If it is determined that any of such identified offers are not applicable to the customer, then the inapplicable offers are removed from the identified offers. Note operation 505. In addition, offers determined to be applicable to the customer are provided to the customer via a single interface, as shown in operation 506. Thus, offers associated with at least one service provider may be displayed to the customer, or an operator in communication with the customer, via the single interface (e.g. GUI, etc.).

It is subsequently determined whether an order has been received from the customer, as shown in decision 508. An order may be received in any desired manner. In one optional embodiment, the order may be received by selection of one of the offers provided via the single interface. Thus, the order may be received electronically via the single interface.

In addition, the order may include a request to accept at least one of the offers provided to the customer in operation 506. Just by way of example, the order may include a request for a service associated with at least one of the service providers. As another option, the order may include a request for a plurality of services, where at least a portion of the requested services are associated with different service providers.

As another example, the order may include a request to take advantage of a discount offered by a service provider. Of course, it should be noted that, in other embodiments, the order may not be associated with a particular offer. For example, the order may include a request for a service, a request to cancel an existing service subscribed to, a trouble ticketing order, a query, a request to modify service parameters, etc.

If it is determined that an order has been received, parameters associated with the order are identified, as shown in operation 510. Thus, the order may include at least one parameter. Further, such parameters may be identified by the customer at the time the order is made by the customer. For example, the customer may configure the order as desired.

As another option, the parameters may be identified based on the particular offer ordered by the customer. In various embodiments, the parameters may include a requested channel (television channel, satellite radio channel, etc.), a requested data speed (e.g. for Internet usage, etc.), etc. Of course, however, the parameters may include any parameters capable of being associated with an order.

Still yet, the order and parameters are sent to the associated service provider(s), as shown in operation 512. The order and parameters may optionally be sent to the service provider via a network. In this way, the service provider may process the order with the associated parameters, such that the customer may be subscribed to the ordered service.

Optionally, the service provider may provide a quote to the customer via the single interface (not shown). The quote may be based on the particular order and associated parameters submitted by the customer. For example, the quote may include a price of a service associated with the order that meets the identified parameters. In addition, the quote may include additional products required to be purchased by the customer in order for the requested service to be provided (e.g. cable box, mobile telephone, etc.).

As yet another option, a technical service appointment may be scheduled in conjunction with submission of the order to the service provider (not shown). The technical service appointment may include any appointment for providing the customer with the capabilities of utilizing the ordered service. Just by way of example, the technical service appointment may include an appointment to install cable in the customer's home, etc.

As shown in operation 514, the customer information may be updated with the new subscription. In the context of the present embodiment, the new subscription may include the service ordered by the customer that is being provided to the customer. Thus, the subscription may include a fulfilled order.

In one embodiment, customer information stored in a database of the service provider associated with the order may be updated with information associated with the subscription. In another embodiment, the customer information stored in a principal database, such as that described above with respect to FIG. 4, may be updated. Of course, however, any database storing customer information may be updated with the new subscription.

Thus, applicable offers may be provided to customers based on each customer's association with particular service providers, utilizing a single interface. In addition, orders may be received from customers in association with a plurality of different service providers, utilizing the single interface. In this way, a central location may be provided for allowing customers to access a plurality of service providers. Accordingly, customers may accept offers, transfer service subscriptions from one service provider to another, update existing subscription information, etc. utilizing a single interface.

Figure 6:
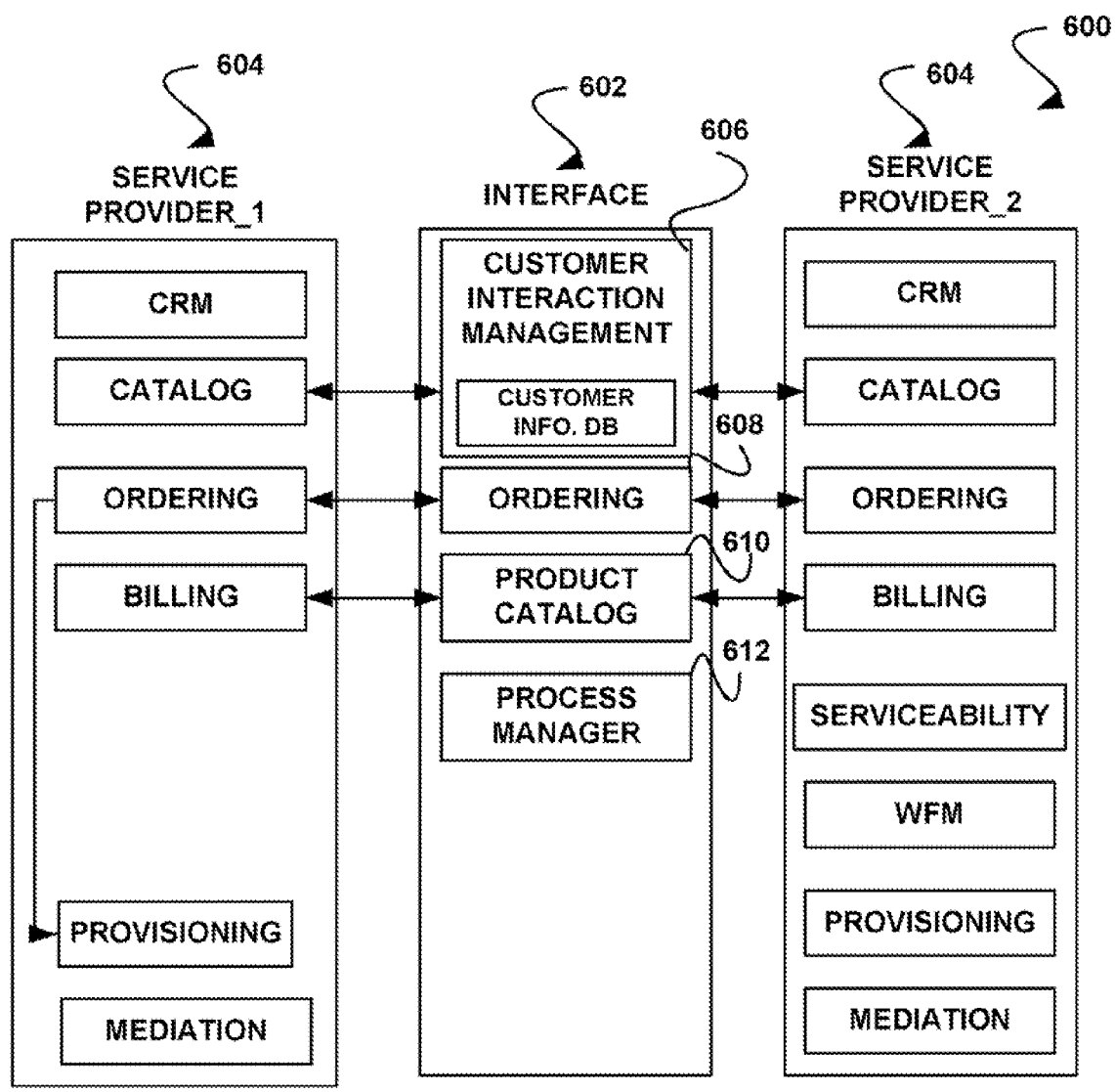
FIG. 6 shows a system for providing a single interface for accessing a plurality of service providers, in accordance with another embodiment.

FIG. 6 shows a system 600 for providing a single interface for accessing a plurality of service providers, in accordance with another embodiment. As an option, the system 600 may be implemented in the context of the details of FIGS. 1-5. Of course, however, the system 600 may be implemented in any desired environment. Again, the aforementioned definitions may equally apply to the description below.

As shown, a single interface 602 may be provided for interfacing a plurality of service providers 604 (service provider—1, service provider_2) to a customer. The interface may include a customer interaction management module 606 for receiving customer information, orders and/or communication from a customer; for sending customer account information (e.g. updates, etc.) and/or communication to the service providers 604; and for receiving customer account information and/or communication from the service providers 604.

Further, the customer interaction management module 606 may include a customer information database. The customer information database may be utilized to locally store customer information. For example; the customer information database may store verified customer accounts and/or any information associated with such accounts. In this way, the customer information database may be utilized for identifying offers applicable to the customer.

Additionally, the single interface 602 may include an ordering module 608. The ordering module 608 may be utilized for sending orders submitted by the customer via the customer interaction management module 606 of the single interface 602 to one of the service providers 604 associated with the order. Thus, the order may be sent to one of the service providers 604 such that such service provider may process and fulfill the order.

Moreover, the single interface 602 may include a product catalog 610. The product catalog 610 may be synchronized with the product catalogs of the service providers 604. For example, the product catalog 610 of the single interface 602 may store information on products, offers, etc. of the service providers 604. In this way, the single interface 602 may locally store information associated with such service providers 604. Accordingly, the single interface 602 may optionally offer services that combine services of different service providers, as described above with respect to FIG. 5 and/or may provide a centralized location for all offers of such service providers 604.

Still yet, the single interface 602 may include a process manager 612. The process manager 612 may manage sessions with customers. For example, the process manager 612 may manage the sending and/or receiving of information to/from customers and service providers 604.

Figure 7:
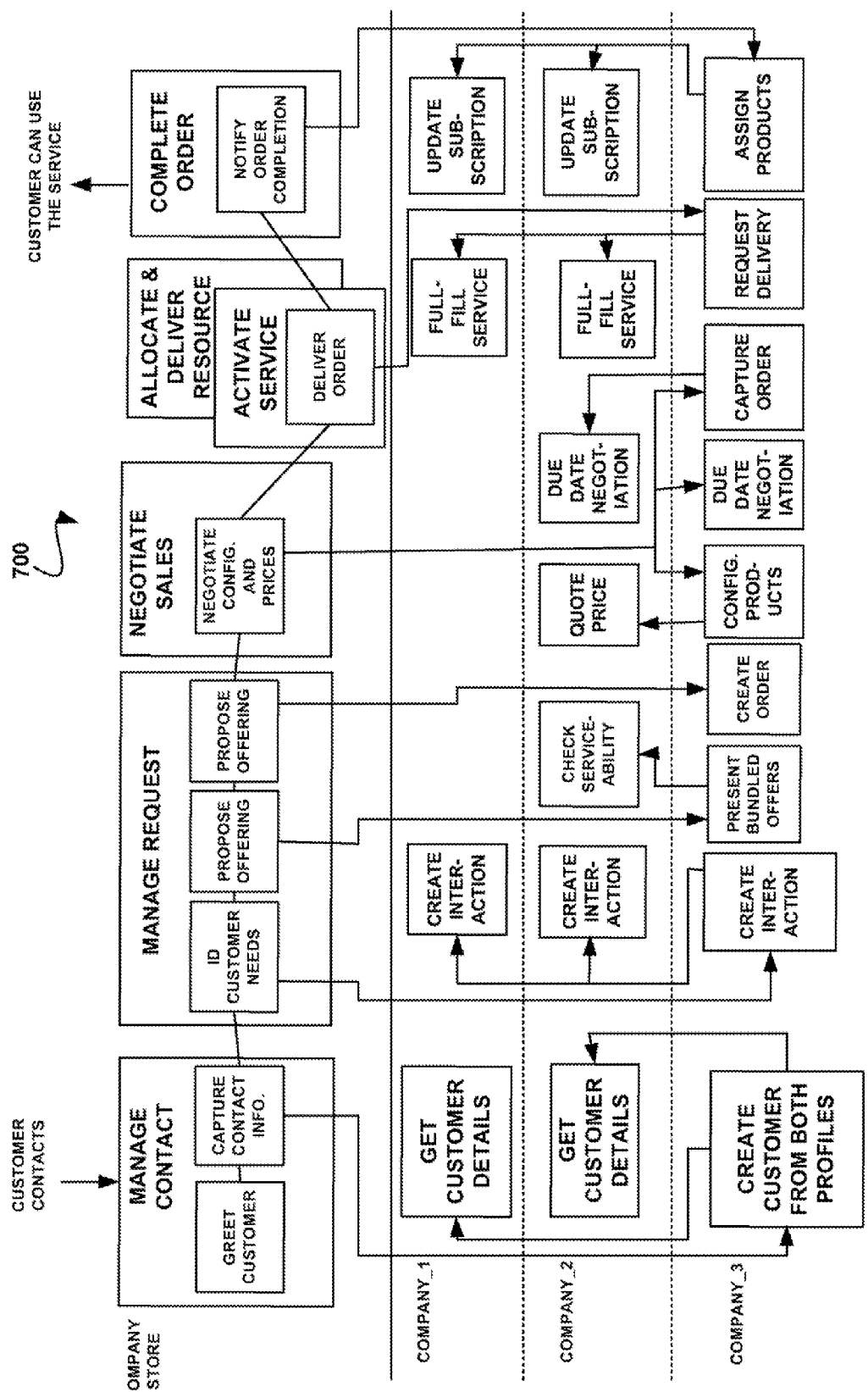
FIG. 7 shows a system for providing a single interface capable of receiving customer orders associated a plurality of service providers, in accordance with yet another embodiment.

FIG. 7 shows a system 700 for providing a single interface capable of receiving customer orders associated a plurality of service providers, in accordance with yet another embodiment. As an option, the system 700 may be implemented in the context of the details of FIGS. 1-6. Of course, however, the system 700 may be used in any desired environment. Again, the aforementioned definitions may equally apply to the description below.

As shown, a customer may initiate a session with a single interface that provides access to a plurality of service providers. For example, the customer may select to open and/or connect to the single interface. The customer may be greeted via the single interface and customer information may be received from the customer via the single interface.

Service providers (company_1, company_2) are then queried utilizing the customer information received from the customer. In particular, the service providers may be queried for customer details, such as accounts associated with the customer, etc. An interfacing company (company_3) that provides the single interface may then create customer account information which includes the customer details received from the service providers. Such customer account information may therefore be stored by the interfacing company.

Customer needs are then identified, as shown. The customer needs may include a particular request from the customer for a type of service. Such request may optionally be made utilizing the single interface. Based on the identified customer needs, an interaction with the customer is created by the interfacing company. Moreover, the interfacing company also creates interactions with the service providers.

Offers are then subsequently proposed to the customer via the single interface. The offers may include any offers made by the service providers. In addition, the offers may include only offers capable of being serviced to the customer (e.g. due to location of the customer, products utilized by the customer, etc.). The offers may therefore be proposed by the interfacing company on behalf of the service providers.

The customer may then accept at least one of the proposed offers, such that an order is created. The configuration of the order and a price associated with the order may then be negotiated based on information received from the service providers. For example, the configuration of products required to provide a service requested in the order may be identified, such that a price of the service and required products may be negotiated to the customer. In addition, a due date of payment may also be negotiated.

The order is then captured based on the negotiated configuration and price. In one embodiment, the order may be captured by the customer accepting the negotiated configuration and price. The order is delivered to the service providers by the interfacing company, such that the service providers may fulfill the order.

Once the order is fulfilled by the service providers, the service providers may notify the interfacing company thereof. The interfacing company may then assign products and/or services associated with the fulfilled order to the customer account information stored by the interfacing company. Moreover, the interfacing company may send an update to the service providers, such that customer account information stored by the service providers may also be updated with such products and/or services associated with the fulfilled order.

In this way, a customer may utilize a single interface for receiving offers. In addition, the customer may utilize the single interface for submitting orders for services to a plurality of service providers. Moreover, the customer may create a single order to request services from more than one service provider.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

receiving, utilizing a processor, information associated with a customer at an interface entity that is separate from a first service provider and a second service provider;

identifying, by the interface entity, the first service provider and the second service provider, based on the information;

querying, by the interface entity, the first service provider for first customer account details stored by the first service provider;

querying, by the interface entity, the second service provider for second customer account details stored by the second service provider;

creating, by the interface entity, customer account information based on the first customer account details and the second customer account details;

storing, by the interface entity, the customer account information;

presenting, by the interface entity, a single interface for displaying the customer account information and providing access to the first service provider and the second service provider;

identifying, by the interface entity, a first capability or feature associated with a first service of the first service provider;

identifying, by the interface entity, a second capability or feature associated with a second service of the second service provider;

providing, by the interface entity, at least one offer to the customer utilizing the single interface, the at least one offer including a unified service offer of a single unified service that includes a combination of the first capability or feature associated with the first service of the first service provider and the second capability or feature associated with the second service of the second service provider;

receiving, at the interface entity, an order from the customer utilizing the single interface, the order including a request for a particular service associated with at least one of the first service provider and the second service provider, and further including at least one parameter;

providing, by the interface entity, a quote to the customer utilizing the single interface, the quote based on the order and the at least one parameter received from the customer, the quote further including a price of the particular service associated with the order that meets the at least one parameter and includes at least one additional product required to be purchased by the customer in order for the particular service to be provided;

receiving at least one notification at the interface entity from the first service provider and the second service provider upon fulfillment of the unified service offer;

assigning, by the interface entity, products or services associated with the fulfilled unified service offer to the customer account information stored by the interface entity;

sending a first update from the interface entity to the first service provider such that the products or services associated with the fulfilled unified service offer are capable of being used to update the first customer account details stored by the first service provider; and sending a second update from the interface entity to the second service provider such that the products or services associated with the fulfilled unified service offer are capable of being used to update the second customer account details stored by the second service provider;

wherein the single interface provides access to the first service provider and second service provider by providing content associated with the first service provider and second service provider, the content including descriptions of the first service provider and second service provider and services provided by the first service provider and second service provider.

2. The method of claim 1, wherein the information includes a telephone number of the customer.

3. The method of claim 1, wherein the information includes an address of the customer.

4. The method of claim 1, wherein the first service provider and the second service provider includes at least one of an Internet service provider, a telephone service provider and a television service provider.

5. The method of claim 1, wherein the customer has an account with each of the first service provider and the second service provider.

6. The method of claim 5, wherein the at least one offer further includes a unified e-mail account offer, the unified email account offer for consolidating an e-mail account with the first service provider and an e-mail account with the second service provider into one virtual e-mail account, such that the user is able to access e-mail associated with the first e-mail account with the first service provider and e-mail associated with the second e-mail account with the second service provider utilizing the one virtual e-mail account.

7. The method of claim 1, wherein identifying the first service provider and the second service provider further comprises identifying accounts of the customer associated with the first service provider and the second service provider, based on the information.

8. The method of claim 7, and further comprising receiving verification of the accounts by the customer.

9. The method of claim 8, wherein receiving verification of the accounts by the customer includes the customer accepting each portion of a plurality of portions of the customer account information, the plurality of portions of the customer account information including specific accounts of the customer and services subscribed to by the customer.

10. The method of claim 1, wherein the parameter is identified by the customer.

11. The method of claim 1, wherein the parameter includes a requested channel.

12. The method of claim 1, wherein the parameter includes a requested data speed.

13. The method of claim 1, wherein the order includes a request for a service associated with the first service provider and a service associated with the second service provider.

14. The method of claim 1, and further comprising storing the information associated with the customer and information associated with the first service provider and the second service provider in a database.

15. The method of claim 1, and further comprising receiving a subscription to at least one service provided by at least one of the first service provider and the second service provider from the customer via the single interface.

16. The method of claim 1, wherein the first service provider and the second service provider are identified by identifying a location of the customer and identifying service providers that offer a service in a vicinity of the location of the customer.

17. The method of claim 1, wherein the single interface is tailored to include service providers capable of being subscribed to by the customer.

18. A computer program product embodied on a non-transitory computer readable medium, comprising:

computer code for receiving information associated with a customer at an interface entity that is separate from a first service provider and a second service provider;

computer code for identifying, by the interface entity, the first service provider and the second service provider, based on the information;

computer code for querying, by the interface entity, the first service provider for first customer account details stored by the first service provider;

computer code for querying, by the interface entity, the second service provider for second customer account details stored by the second service provider;

computer code for creating, by the interface entity, customer account information based on the first customer account details and the second customer account details;

computer code for storing, by the interface entity, the customer account information;

computer code for presenting, by the interface entity, a single interface for displaying the customer account information and providing access to the first service provider and the second service provider;

computer code for identifying, by the interface entity, a first capability or feature associated with a first service of the first service provider;

computer code for identifying, by the interface entity, a second capability or feature associated with a second service of the second service provider;

computer code for providing, by the interface entity, at least one offer to the customer utilizing the single interface, the at least one offer including a unified service offer of a single unified service that includes a combination of the first capability or feature associated with the first service of the first service provider and the second capability or feature associated with the second service of the second service provider;

computer code for receiving, at the interface entity, an order from the customer utilizing the single interface, the order including a request for a particular service associated with at least one of the first service provider and the second service provider, and further including at least one parameter;

computer code for providing, by the interface entity, a quote to the customer utilizing the single interface, the quote based on the order and the at least one parameter received from the customer, the quote further including a price of the particular service associated with the order that meets the at least one parameter and includes at least one additional product required to be purchased by the customer in order for the particular service to be provided;

computer code for receiving at least one notification at the interface entity from the first service provider and the second service provider upon fulfillment of the unified service offer;

computer code for assigning, by the interface entity, products or services associated with the fulfilled unified service offer to the customer account information stored by the interface entity;

computer code for sending a first update from the interface entity to the first service provider such that the products or services associated with the fulfilled unified service offer are capable of being used to update the first customer account details stored by the first service provider; and computer code for sending a second update from the interface entity to the second service provider such that the products or services associated with the fulfilled unified service offer are capable of being used to update the second customer account details stored by the second service provider;

wherein the computer program product is operable such that the single interface provides access to the first service provider and the second service provider by providing content associated with the first service provider and the second service provider, the content including descriptions of the first service provider and the second service provider and services provided by the first service provider and the second service provider.

19. A system, comprising:

a processor adapted for:

receiving information associated with a customer at an interface entity that is separate from a first service provider and a second service provider, identifying, by the interface entity, the first service provider and the second service provider, based on the information, querying, by the interface entity, the first service provider for first customer account details stored by the first service provider, querying, by the interface entity, the second service provider for second customer account details stored by the second service provider, creating, by the interface entity, customer account information based on the first customer account details and the second customer account details, storing, by the interface entity, the customer account information, identifying, by the interface entity, a first capability or feature associated with a first service of the first service provider, identifying, by the interface entity, a second capability or feature associated with a second service of the second service provider, providing, by the interface entity, at least one offer to the customer, the at least one offer including a unified service offer of a single unified service that includes a combination of the first capability or feature associated with the first service of the first service provider and the second capability or feature associated with the second service of the second service provider, receiving at least one notification at the interface entity from the first service provider and the second service provider upon a fulfillment of the unified service offer, assigning, by the interface entity, products or services associated with the fulfilled unified service offer to the customer account information stored by the interface entity, sending a first update from the interface entity to the first service provider such that the products or services associated with the fulfilled unified service offer are capable of being used to update the first customer account details stored by the first service provider, and sending a second update from the interface entity to the second service provider such that the products or services associated with the fulfilled unified service offer are capable of being used to update the second customer account details stored by the second service provider; and a graphical user interface for:

displaying a single interface for displaying the customer account information and providing access to the first service provider and the second service provide, receiving an order from the customer utilizing the single interface, the order including a request for a particular service associated with at least one of the first service provider and the second service provider, and at least one parameter, and providing a quote to the customer, utilizing the single interface, the quote based on the order and the at least one parameter received from the customer, the quote further including a price of the particular service associated with the order that meets the at least one parameter and includes at least one additional product required to be purchased by the customer in order for the particular service to be provided;

wherein the single interface provides access to the first service provider and the second service provider by providing content associated with the first service provider and the second service provider, the content including descriptions of the first service provider and the second service provider and services provided by the first service provider and the second service provider.

* * * * *